(12) United States Patent
Wang

(10) Patent No.: US 8,801,200 B2
(45) Date of Patent: Aug. 12, 2014

(54) REFLECTIVE FILM STRUCTURE FOR PREFORMED STRUCTURAL ELEMENT

(75) Inventor: Shui-Mu Wang, Taichung (TW)

(73) Assignee: Chaei Hsin Enterprise Co., Ltd., Taichung (TW)

( * ) Notice: Subject to any disclaimer, the term of this patent is extended or adjusted under 35 U.S.C. 154(b) by 250 days.

(21) Appl. No.: 13/564,990

(22) Filed: Aug. 2, 2012

(65) Prior Publication Data

US 2013/0286495 A1 Oct. 31, 2013

(30) Foreign Application Priority Data

Apr. 27, 2012 (TW) .............................. 101208007 A

(51) Int. Cl.
*G02B 5/128* (2006.01)
*G02B 5/02* (2006.01)

(52) U.S. Cl.
CPC .............. *G02B 5/128* (2013.01); *G02B 5/0284* (2013.01)
USPC ............................ 359/536; 359/883; 428/161

(58) Field of Classification Search
CPC .... G02B 5/128; G02B 5/0284; G02B 5/0278; B32B 27/08; B32B 7/02; B32B 27/00
USPC .......... 359/599, 883, 534–542; 428/161, 172, 428/214–215, 913.3
See application file for complete search history.

(56) References Cited

U.S. PATENT DOCUMENTS 5,620,775 A * 4/1997 LaPerre ........................ 428/149

* cited by examiner

*Primary Examiner* — James Phan
(74) *Attorney, Agent, or Firm* — Muncy, Geissler, Olds & Lowe, P.C.

(57) ABSTRACT

A reflective film structure is provided for being adhered and shaped on multiple processing surfaces of a preformed structural element, in which the processing surfaces form a three-dimensional shape. The reflective film structure includes a thermoplastic adhesive film and a reflective layer. The thermoplastic adhesive film has a thickness ranging from 0.01 mm to 1 mm, and has an internal surface and an external surface. The internal surface is adhered to the processing surfaces. The reflective layer is laminated on the external surface, and massive beads are distributed on an outer surface of the reflective layer. The reflective film structure has a normal direction vertical to the reflective layer. Furthermore, the reflective layer has at least a first and a second reflective region in different directions, which are respectively towards different directions other than the normal direction. The first and the second reflective region are respectively disposed with beads.

10 Claims, 3 Drawing Sheets

REFLECTIVE FILM STRUCTURE FOR PREFORMED STRUCTURAL ELEMENT

CROSS-REFERENCES TO RELATED APPLICATIONS

This non-provisional application claims priority under 35 U.S.C. §119(a) on Patent Application No. 101208007 filed in Taiwan, R.O.C. on 2012 Apr. 27, the entire contents of which are hereby incorporated by reference.

BACKGROUND

1. Technical Field

The invention relates to a thin film structure, and more particularly to a reflective film structure that is adhered and shaped on multiple processing surfaces of a preformed structural element and provides a multi-directional reflection effect.

2. Related Art

A conventional reflective film structure can only be used for adhesion to a large-area plane or a small-curvature curved surface to provide a certain degree of reflective effect. For a preformed structural element having processing surfaces in different directions, limited by a substrate and a surface reflecting layer, the conventional reflective film structure is not applicable to the processing surfaces in different directions of the preformed structural element, or easily deforms, warps or comes off in a usage environment.

For other limitations on the reflection effect, reference can be made to FIG. 1, which is a partial sectional view of a conventional reflective film structure applied in a planar object 40. A reflective film structure 20 is mainly formed by distributing transparent beads 21 with grain diameters less than 0.1 cm on a substrate 22. Before the transparent beads 21 are disposed, a surface of the substrate 22 may be coated or electroplated with a "reflecting surface" in advance. The transparent beads 21 are disposed towards a normal direction F of the reflective film structure 20. When light impinges upon the transparent bead 21, the light is refracted and reflected many times in the transparent bead 21, thereby providing a certain degree of scattering effect. The reflecting surface can also reflect the light perpendicularly incident or refracted from the transparent bead 21, so as to achieve an auxiliary reflective effect. However, the problem lies in the fact that most of the reflective effect comes from direct reflection and partial scattering, and although not completely the same as the direct reflection, the reflective effect is still restricted by the direction from which the incident light comes. Furthermore, if the reflective film structure is applied to the processing surfaces in different directions of the preformed structural element, limited by the adhering processing problem, the reflective film structure may be adhered to only one local planar region with a large area selectively, resulting in a limited reflective effect. Unless the reflective film structure is divided into small parts and is adhered to regions one by one, it is impossible to achieve the wide-angle reflective effect.

SUMMARY

Accordingly, the invention provides a reflective film structure, for the purpose of being adhered and shaped on multiple processing surfaces of a preformed structural element, in which the processing surfaces form a three-dimensional shape. The reflective film structure includes a thermoplastic adhesive film and a reflective layer. A thickness of the thermoplastic adhesive film ranges from 0.01 mm to 1 mm, and the thermoplastic adhesive film has an internal surface and an external surface. The internal surface is adhered to the processing surfaces of the preformed structural element. The reflective layer is laminated on the external surface of the thermoplastic adhesive film, and a lot of beads are distributed on an outer surface of the reflective layer. The reflective film structure has a normal direction vertical to the reflective layer. Furthermore, the reflective layer has at least a first reflective region and at least a second reflective region in different directions, which are respectively towards different directions other than the normal direction. The first reflective region and the second reflective region are respectively disposed with beads.

In conclusion, the reflective film structure according to the invention can be adhered and shaped on multiple processing surfaces of different preformed structural elements in a suitable processing environment, and form a special three-dimensional shape the same as that formed by these processing surfaces, thereby providing a wide-angle reflective effect better than that of a conventional planar reflective film. Thicknesses of the reflective layer and the thermoplastic adhesive film can be adjusted as required. In an ordinary usage scenario, as long as a thermal shaping temperature range of the reflective film structure is not exceeded, the reflective film structure can maintain a solid state, and is prevented from warping, deformation or detachment. Meanwhile, the reflective layer having a concave-convex structure can respectively provide one or more groups of first reflecting surfaces and second reflecting surfaces. Even if being adhered to a flat plane towards the normal direction of the reflective film structure, the reflective layer can provide a wide-angle reflective effect better than that of the conventional planar reflective film.

BRIEF DESCRIPTION OF THE DRAWINGS

The invention will become more fully understood from the detailed description given below for illustration only, and thus not limitative of the invention, wherein.

DETAILED DESCRIPTION

Figure 1:
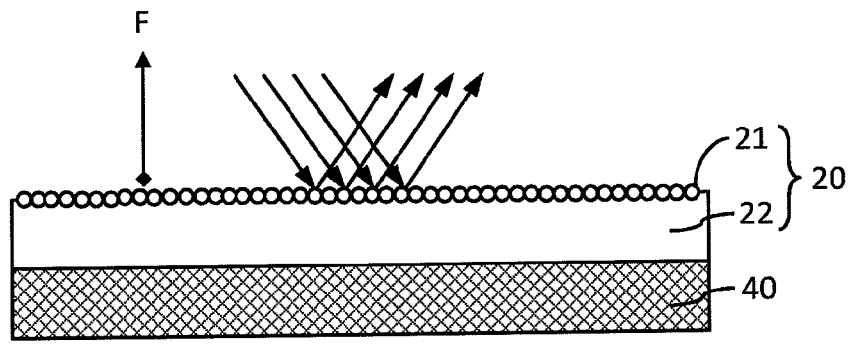
FIG. 1 is a schematic sectional view of a reflective film structure according to a first embodiment of the invention.

A reflective film structure of the invention is applicable to secondary processing of a "preformed structural element", so that multiple processing surfaces of the preformed structural element can provide a wide-angle reflective effect. The "preformed structural element" refers to an outer structural element (such as a housing of an electronic product or any part of an industrial manufacturable product) that is manufactured and formed in advance (namely the introduced reflective film structure is not designated for being applying during the molding process or manufacturing process of the preformed structural element). A material of the preformed structural element may be a plastic or non-plastic material, which, for example, may be selected from a group consisting of polycarbonate (PC), acrylonitrile butadiene styrene (ABS), PC/ABS resin composite material, nylon, alloy, memory alloy, metal, hard rubber, soft rubber, foam material, rigid plastic and flexible plastic, or any combination thereof An example of the preformed structural element may be an enclosure element or protection case of mobile electronic devices such as a mobile phone, a notebook computer, a tablet computer and peripheral products thereof, or an enclosure element or decoration panel of other household appliances such as an air conditioner, a television, acoustic equipment, a refrigerator, an air purifier and a dehumidifier. However, the invention is not thus limited.

The preformed structural element has multiple continuous processing surfaces, and these continuous processing surfaces are located in different planes, thereby forming a special three-dimensional shape. For different preformed structural elements, the processing surfaces may be planes, cambered surfaces or irregular curved surfaces, have different sizes and locations, and may be provided with holes of different shapes. For a protection case integrated on the rear side of a smart phone, although main processing surfaces of the protection case may be one rear surface and four lateral surfaces, three-dimensional shapes formed by different processing surfaces on the enclosure are not completely the same due to different overall designed shapes. In order to adapt to different three-dimensional shapes formed by different processing surfaces, the reflective film structure of the invention is required to have a thermoplastic processing effect. In addition, the reflective film structure is also required to have a property of maintaining a fixed shape at a normal temperature or at twice to triple of the normal temperature, so that a finished product is not easily deformed when being affected by an ambient temperature. The reflective film structure of the invention should therefore exclude application of thermosetting materials.

To achieve an optimal description effect of the embodiments, figures of the invention are drawn as schematic views. The proportion, thickness, grain diameter and interval may be slightly different from those in practical implementations, and should be subject to the description of respective embodiment.

Figure 2:
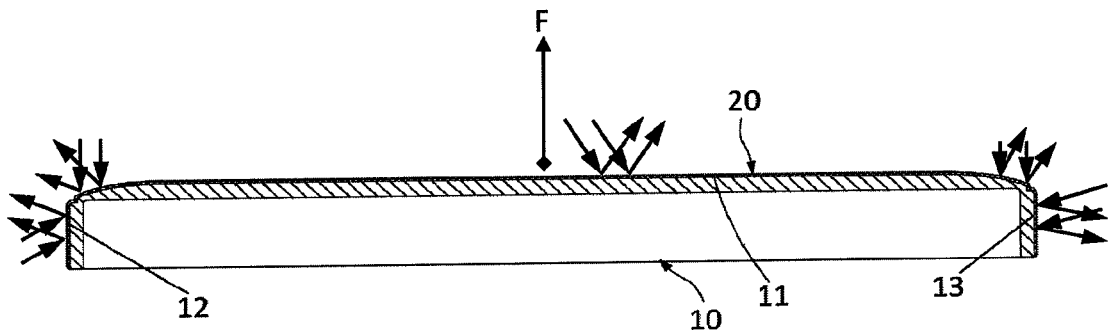
FIG. 2 is a schematic sectional view of a reflective film structure according to a second embodiment of the invention.

Please refer to FIG. 2, which is a schematic sectional view of a reflective film structure adhered to a preformed structural element according to an embodiment of the invention. In FIG. 2, a reflective film structure 20 is already adhered and shaped on different processing surfaces 11/12/13 of a preformed structural element 10, forming a three-dimensional shape exactly the same as what formed by the processing surfaces 11/12/13 integrally. The reflective film structure 20 has a normal direction F vertical to the reflective layer. However, apart from a direction of a central region of the processing surface 11, directions of two lateral edges of the processing surface 11 and the processing surfaces 12 and 13 are different from each other, and are different from the normal direction. As a result, after the reflective film structure 20 is adhered and shaped on the processing surfaces 11/12/13, the reflective film structure 20 can utilize all ambient light sources from different angles, thereby producing a better wide-angle reflective effect in comparison with a planar reflecting film. Details of the reflective film structure of the invention and a method for adhering and shaping the reflective film structure on different processing surfaces of the preformed structural element will be described in the subsequent embodiments.

Figure 3:
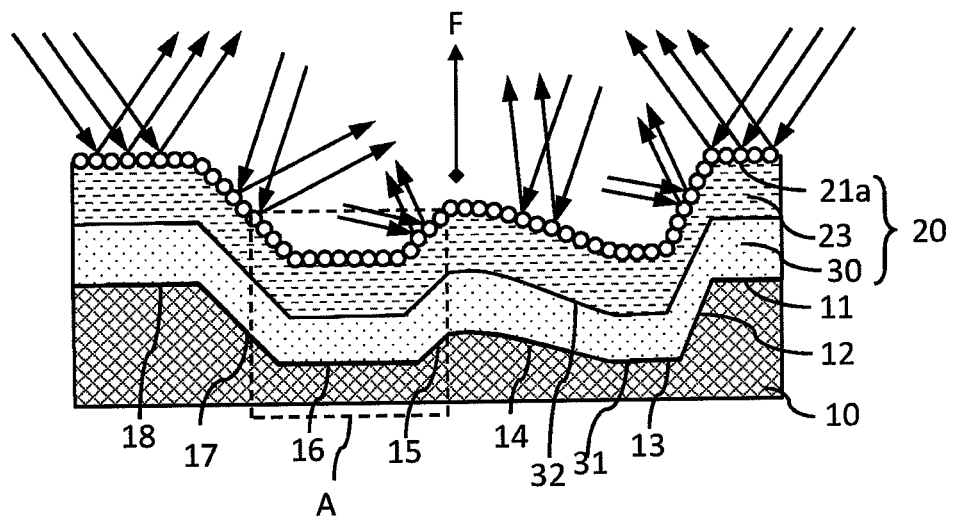
FIG. 3 is a schematic sectional view of a reflective film structure according to a third embodiment of the invention.

Please refer to FIG. 3, which is a schematic sectional view of a reflective film structure adhered to a preformed structural element according to another embodiment of the invention. In FIG. 3, a reflective film structure 20 is already adhered and shaped on different processing surfaces 11/12/13/14/15/16/17/18 of a preformed structural element 10, and has a three-dimensional shape the same as that formed by the processing surfaces 11/12/13/14/15/16/17/18 integrally. The reflective film structure 20 is mainly formed by a reflective layer 23 and a thermoplastic adhesive film 30.

In order to have a thermoplastic processing effect and a property of maintaining a fixed shape at a normal temperature, the reflective film structure 20 has a thermal shaping temperature range from 80° C. to 250° C. In a processing environment that provides the thermal shaping temperature range, the reflective film structure 20 can be adhered and shaped on the processing surfaces 11/12/13/14/15/16/17/18 of the preformed structural element 10, forming a specific three-dimensional shape shown in FIG. 3. In the foregoing thermal shaping temperature range, the reflective film structure 20 can be adhered and shaped on the processing surfaces 11/12/13/14/15/16/17/18 of the preformed structural element 10. When the temperature is below the thermal shaping temperature range, the reflective film structure 20 can be cured into a three-dimensional shape the same as that of the processing surfaces 11/12/13/14/15/16/17/18.

The thermoplastic adhesive film 30 has an internal surface 31 and an external surface 32. The internal surface 31 may be adhered to the processing surfaces 11/12/13/14/15/16/17/18 of the preformed structural element 10 through an adhesive, and the external surface 32 is adjacent to an internal side of the reflective layer 23. In an embodiment, a thickness of the thermoplastic adhesive film 30 ranges from 0.01 mm to 1 mm. In some embodiment, a material of the thermoplastic adhesive film 30 is selected from a group consisting of nylon, thermoplastic polyurethane (TPU), thermoplastic rubber (TPR), thermoplastic vulcanizates (TPV), thermoplastic polyolefin (TPO), polyethylene terephthalate (PET) and ethylene vinyl acetate (EVA), and any combination thereof. Further, in an embodiment, the thermoplastic adhesive film 30 may have the foregoing thermal shaping temperature range, so as to provide the adhering and shaping function to the reflective film structure 20.

The reflective layer 23 is laminated on the external surface 31 of the thermoplastic adhesive film 30, and a lot of beads 21a are distributed on an outer surface of the reflective layer 23. In an embodiment, an average grain diameter of the beads 21a is less than 0.1 cm. In some embodiments, the bead 21a is made of a metal or has a metal surface. In other embodiments, the bead 21a may have a transmittance (that is, being transparent or semitransparent), and is implemented by, for example, a glass bead. In another embodiment, the reflective layer 23 has a reflecting surface (not shown) located at the outer surface of the reflective layer 23, and all the beads 21a are located on the reflecting surface. The reflecting surface may be selected from a group consisting of aluminum and an aluminum alloy, silver and a silver alloy, mica, shell powder and pearl powder, or any combination thereof, and is coated on the outer surface of the reflective layer 23 in an existing processing manner. In an embodiment, a material with a thermal shaping property may be selected as a substrate of the reflective layer 23, which is, for example, selected from a group consisting of nylon, TPU, TPR, TPV, TPO, PET and EVA, and any combination thereof. A thickness of the reflective layer 23 may range from 0.01 mm to 1 mm.

In FIG. 3, the reflective film structure 20 has a normal direction F vertical to the reflective layer. The processing surfaces 11/13/16/18 of the preformed structural element 10 are towards the normal direction. Therefore, in regions corresponding to the processing surfaces 11/13/16/18 of the reflective film structure 20, the beads 21a are disposed towards the normal direction F. However, the processing surfaces 12/14/15/17 are all towards directions other than the normal direction. Therefore, after the reflective film structure 20 is adhered and shaped on the processing surfaces 12/14/15/17 of the preformed structural element 10, the beads 21*a* disposed in corresponding regions are towards different directions, and these directions are also different from the normal direction F. As a result, the reflective film structure 20 can provide a wide-angle reflective effect better than that of the conventional planar reflective film.

Figure 3A:
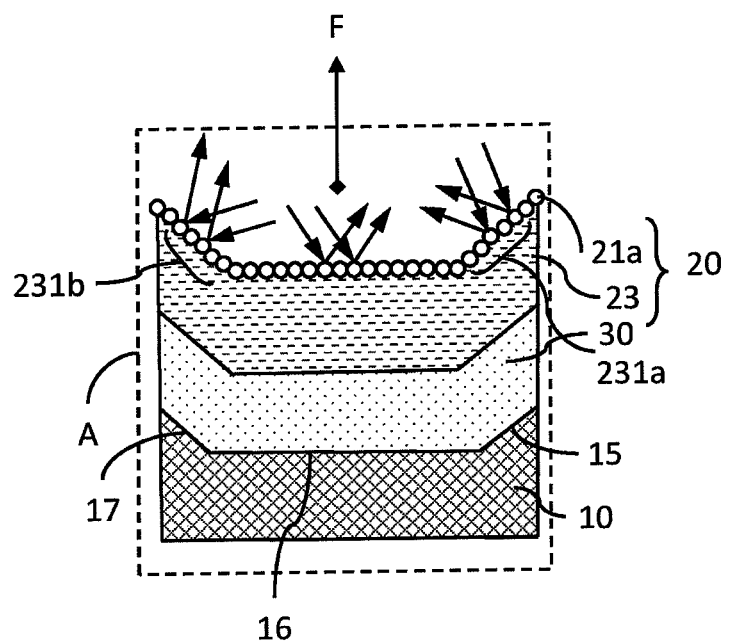
FIG. 3A is an enlarged view of a region A in FIG. 3.

FIG. 3A is an enlarged view of a region A in FIG. 3. The reflective layer 23 has a first reflective region 231*a* and a second reflective region 231*b* in different directions, which are respectively towards directions other than the normal direction F. The first reflective region 231*a* is towards the upper left side of FIG. 3A, and the second reflective region 231*b* is towards the upper right side of FIG. 3A. The first reflective region 231*a* and the second reflective region 231*b* are respectively disposed with multiple beads 21*a*, thereby providing a wide-angle reflective effect better than that of a pure planar reflective film integrally. It can be easily seen from FIG. 3A that, the first reflective region 231*a* and the second reflective region 231*b* are generated because the reflective film structure 20 can be tightly adhered and shaped on the processing surfaces 15 and 17 of the preformed structural element 10. Therefore, it is relatively important to use materials having the foregoing thermal shaping temperature range to form a two-layer construction including the thermoplastic adhesive film 30 and the reflective layer 23 of the reflective film structure 20.

Figure 3B:
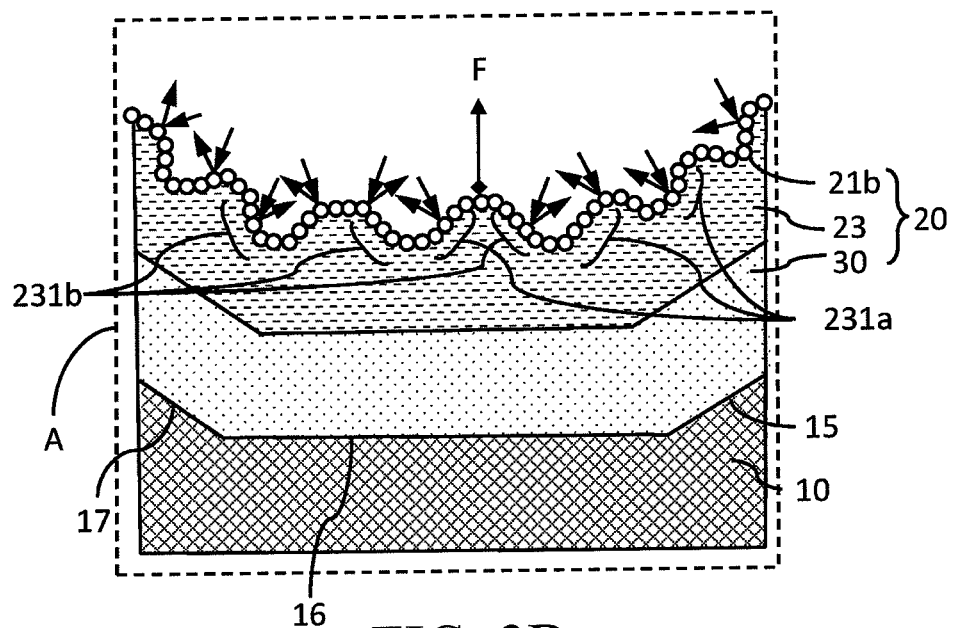
FIG. 3B is a schematic partial sectional view of a reflective film structure adhered to a preformed structural element according to another embodiment of the invention.

Please refer to FIG. 3B, which is a schematic partial sectional view of a reflective film structure adhered to a preformed structural element according to another embodiment of the invention, in which only the region A is shown like in FIG. 3A. The difference between FIG. 3B and FIG. 3A lies in that, a surface of the reflective layer 23 in FIG. 3B has a concave-convex structure, and multiple first reflective regions 231*a* and multiple second reflective regions 231*b* are already generated (only some are marked in the figure). The first reflective regions 231*a* and the second reflective regions 231*b* are in different directions, and are respectively towards directions other than the normal direction F. The first reflective regions 231*a* are towards the upper left side of FIG. 3B, and the second reflective regions 231*b* are towards the upper right side of FIG. 3B. After the reflective film structure 20 is adhered and shaped on the processing surface 16 of the preformed structural element 10, even if the processing surface 16 is towards the normal direction F, a region on the reflective layer 23 and corresponding to the processing surface 16 has a concave-convex structure and thereby has 5 or 6 first reflective regions 231*a* or second reflective regions 231*b*, so that beads 21*b* disposed on the first reflective regions 231*a* or second reflective regions 231*b* of the concave-convex structure of the reflective layer 23 can provide a multi-angle reflective effect, which is not limited by whether the surface to which the reflective film structure 20 is adhered is planar or three-dimensional.

Figure 4:
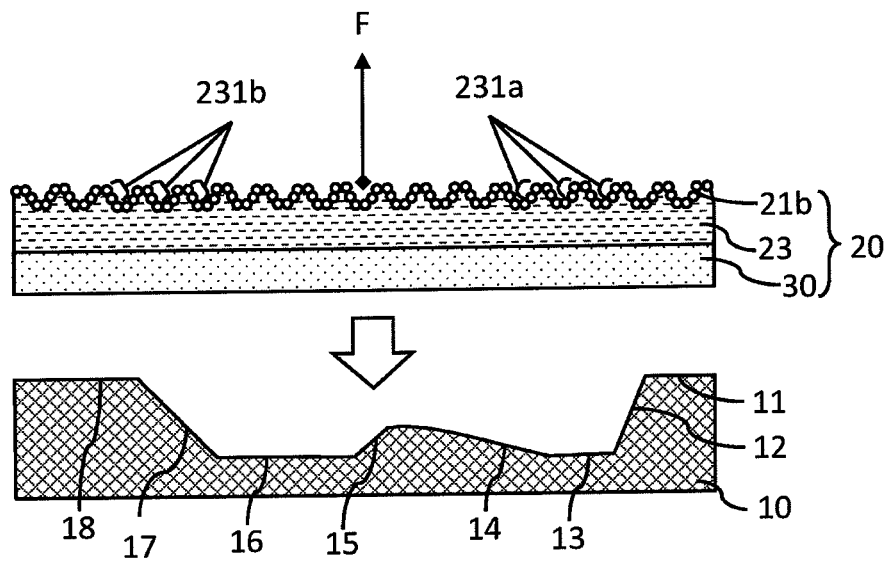
FIG. 4 is a schematic sectional view of a reflective film structure according to a fourth embodiment of the invention.

FIG. 4 is a schematic sectional view of a reflective film structure that is not yet adhered to processing surfaces of a preformed structural element in another embodiment of the invention. Before the adhesion, the reflective layer 23 on the reflective film structure 20 has a concave-convex structure, thereby providing multiple first reflective regions 231*a* and multiple second reflective regions 231*b* (only some are marked in the figure), and are disposed with beads 21*b*. The first reflective regions 231*a* and the second reflective regions 231*b* are in different directions, and are respectively towards directions other than the normal direction F. The first reflective regions 231*a* are towards the upper left side of FIG. 3B, and the second reflective regions 231*b* are towards the upper right side of FIG. 3B. In some embodiment, the reflective film structure 20 may be heated to the foregoing heat shaping temperature range through a heating mould (not shown), or by other heating means. At this time, negative pressure evacuation is performed to form a vacuum environment, so that the reflective film structure 20 is tightly adhered to multiple processing surfaces 11 to 18 of the preformed structural element 10, and forms a three-dimensional shape the same as that of a whole of the processing surfaces 11 to 18. In an embodiment, due to the concave-convex structure on the reflective layer, during the adhering and shaping process of the reflective film structure, an original interval between adjacent beads may be decreased. Therefore, in order to prevent the adjacent beads from pressing against each other and coming off during the adhering and shaping process of the reflective film structure, the beads 21*b* in FIG. 3B and FIG. 4 may have a smaller size or a greater interval than that of the beads 21*a* in FIG. 3. For example, an average grain diameter of the beads 21*b* may be less than 0.05 cm, or an average interval of adjacent beads 21*b* may be greater than 0.05 cm. After the adhering and shaping process is completed, the reflective film structure 20 may have a burr (not shown), on the periphery of the processing surfaces 11 to 18 of the preformed structural element 10. When the burr is trimmed by a specially designed cutting mould, the reflective effect processing of the processing surfaces 11 to 18 of the preformed structural element 10 is finished. For the result after the thermoplastic adhering/shaping and burr trimming of the processing surfaces 11 to 13 of the preformed structural element 10, reference may be made to another example as shown in the sectional view of FIG. 2.

In conclusion, the reflective film structure according to the invention can be adhered and shaped on multiple processing surfaces of different preformed structural elements in a suitable processing environment, and form a special three-dimensional shape the same as that formed by these processing surfaces, thereby providing a wide-angle reflective effect better than that of a conventional planar reflective film. Thicknesses of the reflective layer and the thermoplastic adhesive film can be adjusted as required. In an ordinary usage scenario, as long as a thermal shaping temperature range of the reflective film structure is not exceeded, the reflective film structure can maintain a solid state, and is prevented from warping, deformation or detachment. Meanwhile, the reflective layer having a concave-convex structure can respectively provide one or more groups of first reflecting surfaces and second reflecting surfaces. Even if being adhered to a flat plane towards the normal direction of the reflective film structure, the reflective layer can provide a wide-angle reflective effect better than that of the conventional planar reflective film.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:
1. A reflective film structure, adapted for being adhered and shaped on a plurality of processing surfaces of a preformed structural element, wherein the processing surfaces form a three-dimensional shape, the reflective film structure comprising:

a thermoplastic adhesive film with a thickness ranging from 0.01 mm to 1 mm, having an internal surface and an external surface, wherein the internal surface is adhered to the processing surfaces of the preformed structural element; and a reflective layer, laminated on the external surface of the thermoplastic adhesive film, having a plurality of beads distributed on an outer surface of the reflective layer, wherein the reflective film structure has a normal direction vertical to the reflective layer, the reflective layer has at least a first reflective region and at least a second reflective region that have different directions and are respectively towards different directions other than the normal direction, and the first reflective region and the second reflective region are respectively disposed with at least one of the beads.

2. The reflective film structure according to claim 1, wherein the reflective film structure has a thermal shaping temperature range from 80° C. to 250° C., the reflective film structure being shapeable when adherable on the processing surfaces of the preformed structural element in the thermal shaping temperature range, the reflective film structure being cured into the three-dimensional shape exactly the same as the processing surfaces integrally when below the thermal shaping temperature range.

3. The reflective film structure according to claim 2, wherein the thermoplastic adhesive film is selected from a group consisting of nylon, thermoplastic polyurethane (TPU), thermoplastic rubber (TPR), thermoplastic vulcanizates (TPV), thermoplastic polyolefin (TPO), polyethylene terephthalate (PET) and ethylene vinyl acetate (EVA), and any combination thereof.

4. The reflective film structure according to claim 2, wherein the preformed structural element is selected from a group consisting of polycarbonate (PC), acrylonitrile butadiene styrene (ABS), PC/ABS composite material, nylon, alloy, memory alloy, metal, hard rubber, soft rubber, foam material, rigid plastic and flexible plastic, and any combination thereof.

5. The reflective film structure according to claim 2, wherein at least one of the thermoplastic adhesive film and the reflective layer has the thermal shaping temperature range from 80° C. to 250° C.

6. The reflective film structure according to claim 1, wherein an average grain diameter of the beads is less than 0.1 cm.

7. The reflective film structure according to claim 1, wherein an average interval of the beads is greater than 0.05 cm and/or an average grain diameter of the beads is less than 0.05 cm.

8. The reflective film structure according to claim 1, wherein a thickness of the reflective layer ranges from 0.01 mm to 1 mm.

9. The reflective film structure according to claim 1, wherein the bead is made of a metal, or has a metal surface, or has a transmittance.

10. The reflective film structure according to claim 1, wherein the beads are located on a reflecting surface at an external side of the reflective layer, and the reflecting surface is selected from a group consisting of aluminum and an aluminum alloy, silver and a silver alloy, mica, shell powder and pearl powder, or any combination thereof.

* * * * *